United States Patent [19]

West et al.

[11] Patent Number: 4,805,335
[45] Date of Patent: Feb. 21, 1989

[54] SORTING DEVICE FOR TRAWL NETS

[75] Inventors: Charles W. West, Seattle; Gary F. Loverich, Bainbridge Island, both of Wash.

[73] Assignee: Nor'Eastern Trawl Systems, Inc., Bainbridge Island, Wash.

[21] Appl. No.: 162,986

[22] Filed: Mar. 1, 1988

[51] Int. Cl.$^4$ .............................................. A01K 73/02
[52] U.S. Cl. ............................................................ 43/9
[58] Field of Search .............................................. 43/9

[56] References Cited

U.S. PATENT DOCUMENTS

| 3,195,261 | 7/1965 | Luketa | 43/9 |
| 3,440,752 | 4/1969 | Minter | 43/9 |
| 4,043,068 | 8/1977 | Savoie | 43/9 |
| 4,402,154 | 9/1983 | Pence | 43/9 |
| 4,739,574 | 4/1988 | Saunders | 43/9 |

OTHER PUBLICATIONS

"New Dutch Beam Trawl Stops Flatfish Slaughter", World Fishing, Jun. 1965, pp. 96 and 99.

"U.S. Design for 'Separator' Shrimp Trawl", World Fishing, Jun. 1969, pp. 60-62.

Primary Examiner—Gene P. Crosby
Attorney, Agent, or Firm—Christensen, O'Connor, Johnson & Kindness

[57] ABSTRACT

A sorting device (42) for a bottom trawl (10) to enable capturing preselected marine life and harmlessly separating nonselected marine life. The sorting device (42) comprises a top wall (44) and a bottom wall (46) assembled together to form a body (48) that defines an inlet (50) and tapers to a small outlet (52). The sorting device (42) assumes a funnel configuration as the bottom trawl (10) is towed through the water. Water flowing through the funnel-shaped body (48) moves slower than the surrounding water, forcing water approaching the sorting device (42) to flow around and past the sorting device (42). This creates a water disturbance (94) adjacent and ahead of the sorting device (42) that frightens finfish (96) to swim around the sorting device (42). Shellfish (98) are unable to swim around the sorting device (42) and they pass through the inlet (50) and out the outlet (52) to harmlessly exit the bottom trawl (10).

10 Claims, 3 Drawing Sheets

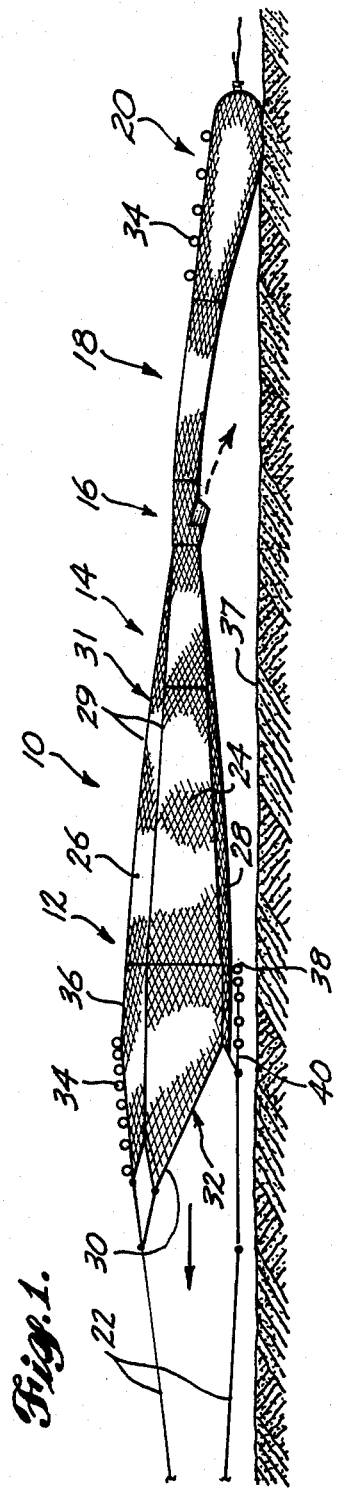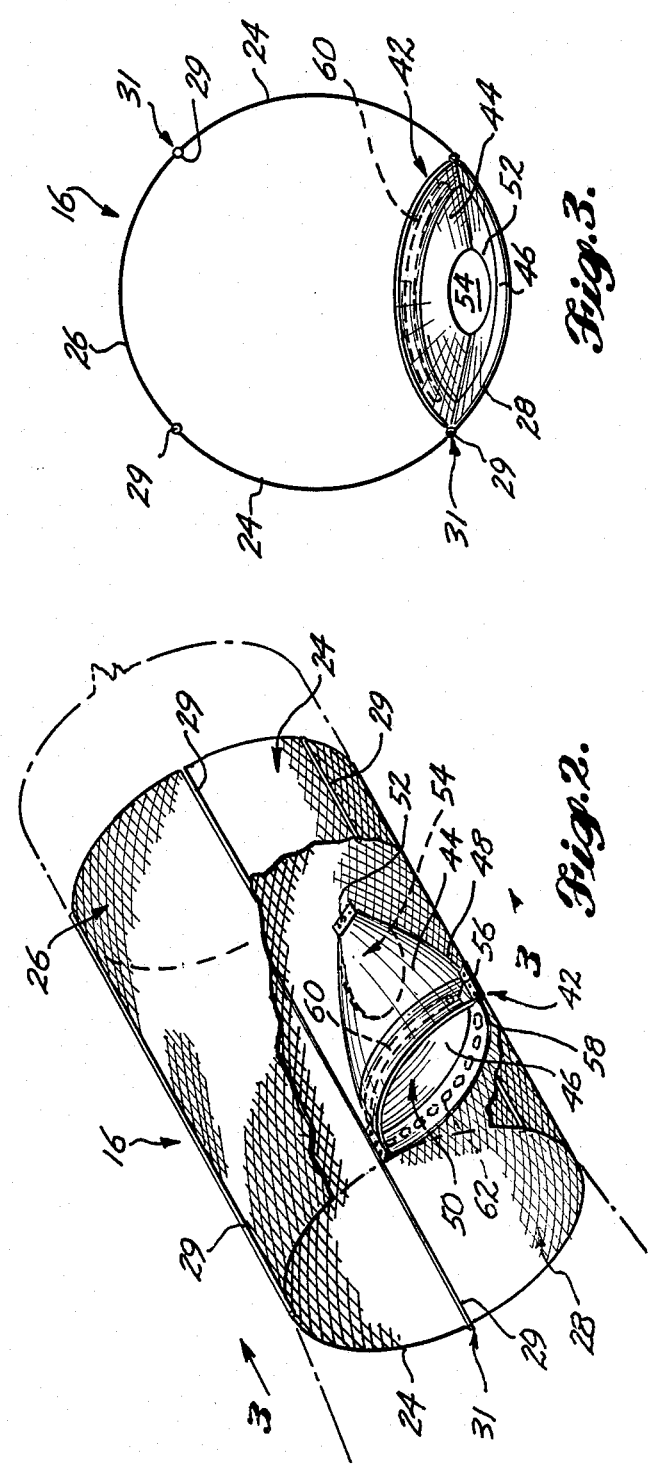

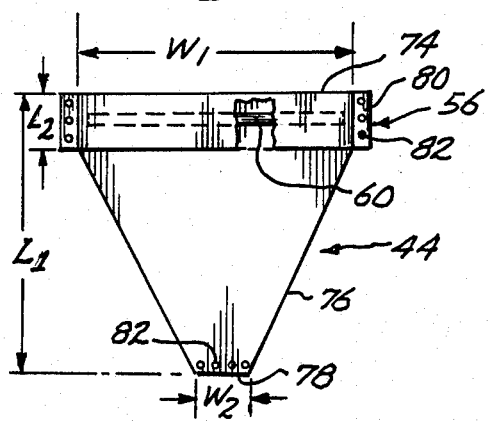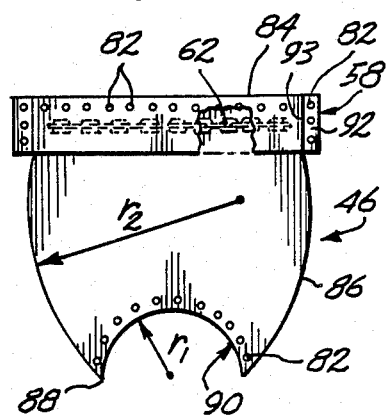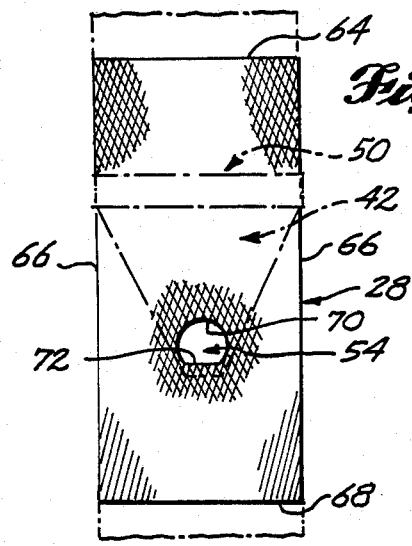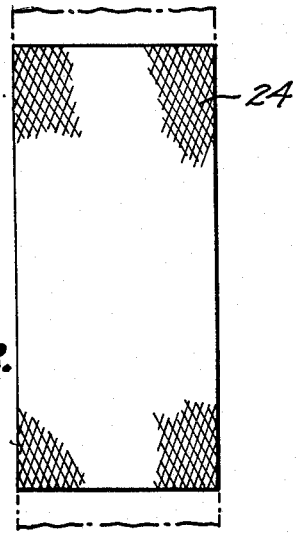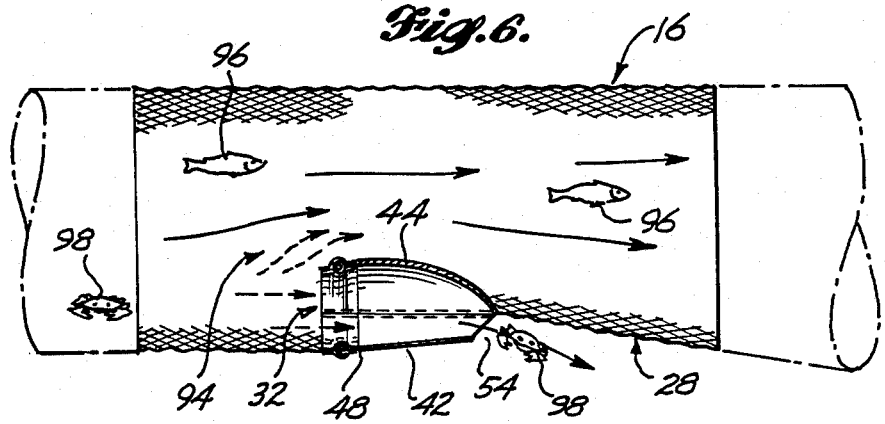

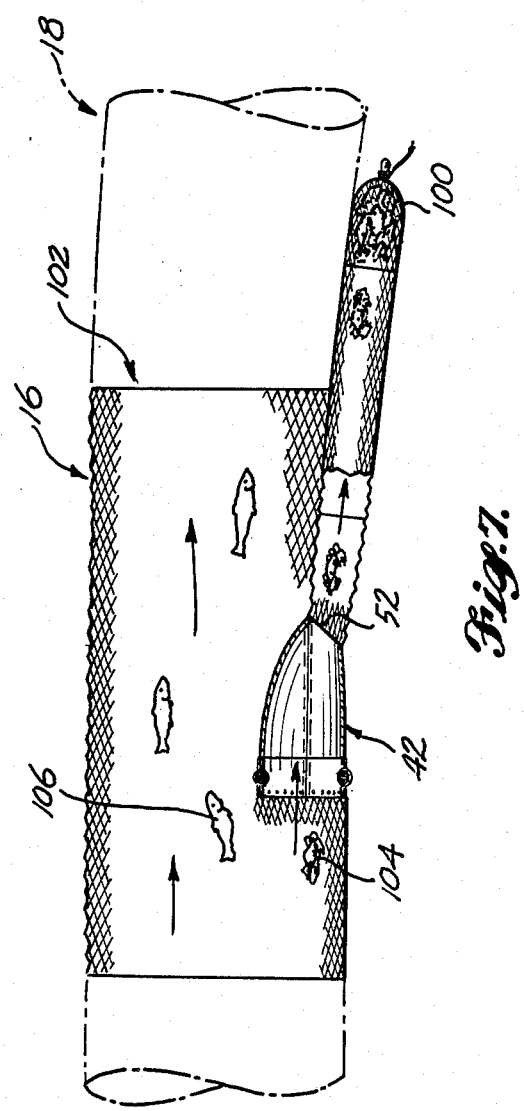

SORTING DEVICE FOR TRAWL NETS

TECHNICAL FIELD

The present invention relates to fishing equipment, and, more specifically, to nets used for capturing preselected marine life and harmlessly separating nonselected marine life.

BACKGROUND OF THE INVENTION

Trawls and other towed nets are widely used in commercial fishing operations for capturing sea life used for human consumption and the manufacture of products. These nets, however, are notoriously nonselective. In other words, any organisms in the path of the net that are large enough to be retained by the mesh of the net and that are not able or inclined to swim out of its path will be captured. Typically, trawl fishermen find that their catches contain not only the sizes and species of marine life that they are seeking, but also include other species and size categories that are undesirable for various conservation, fisheries management, economic, or other reasons. Because capturing certain species of marine life exposes fishermen to severe penalties from fisheries enforcement agencies, fishermen often have to take costly and troublesome measures in order to avoid these unwanted catches, such as moving out of the area, altering their fishing tactics or gear, or curtailing their operations altogether. Because hand or mechanical sorting after the catch often results in destruction or injury of many of the unwanted catch, there is a need for a means for sorting out the undesirable catch while retaining the desirable species in the net as the gear is fishing and before it is hauled back to the ship.

One attempt at achieving this objective involved varying the mesh sizes in the critical parts of the trawl, making one portion large enough to retain the target species while letting the others escape through the enlarged openings. The drawback to this method is that sorting by size does not give satisfactory results because the undesirable organisms are sometimes the same size as the target species or even larger. For instance, in the West Coast shrimp fisheries, the small mesh sizes required to retain shrimp also retain large quantities of unwanted fish such as smelt. Another drawback is that even large mesh openings will not prevent crustaceans from becoming entangled in the netting. This can be very costly in areas such as the Bering Sea sole fishery where the fishermen face harsh sanctions for capturing various species of crabs that are found in the most productive sole grounds.

SUMMARY OF THE INVENTION

In accordance with the present invention, a sorting device for a trawl net is provided. The net has an inlet that opens to an inside region formed by sidewalls that include a top, a bottom, and a cod end. The sorting device comprises an opening in the bottom of the net and a fabric funnel, having a large mouth at one end and a small opening at the other end, oriented inside the net so that the mouth faces toward the inlet of the net and the small opening of the funnel communicates with the opening in the bottom of the net. Preferably, the fabric funnel is formed such that as the net is pulled through the water, a water disturbance is created adjacent the mouth of the funnel that causes desired marine life to avoid entering the funnel and permits unwanted marine life to enter the funnel and pass through the preformed opening in the bottom to the outside of the net.

In accordance with another aspect of the present invention, the funnel is attached to the opening in the bottom of the net so that the opening is tilted to face towards the inlet of the net as the trawl net is towed through the water.

As will be readily appreciated from the foregoing description, the present invention provides a sorting device that is designed to be as compatible as possible with commonly used trawls and to interfere as little as possible with normal fishing practices. The fabric funnel is tailored to be mounted within the net without further modifications. It is made entirely out of flexible components so that it may be rolled up onto a net reel with the rest of the net, thus reducing the possibility that its use will interfere with fishing operations or cause damage to the rest of the gear. The components chosen are extremely rugged to withstand the wear and tear of daily fishing operations without needing any maintenance or adjustment.

The sorting device is designed to rely on hydrodynamic principles and the behavior of marine life so that its physical operation and sorting function are carried out automatically with no further attention from the fisherman. When properly installed within a bottom trawl, the sorting device provides a hydrodynamic obstruction within the net that creates a water disturbance adjacent the mouth of the fabric funnel. This water disturbance frightens fish, causing them to swim upward and above the sorting device. Since shellfish such as crabs and crustaceans have poor swimming abilities and do not float, installing the funnel in the bottom of the net ensures that most crabs will encounter it as they pass down the trawl. Because the funnel's outlet penetrates the bottom of the net, anything entering the funnel will be carried harmlessly out of the trawl.

Although the present invention is described in the context of bottom fishing with an objective of eliminating crustaceans from the catch without harming them, it is to be understood that the present invention will have applications in other areas as well.

BRIEF DESCRIPTION OF THE DRAWINGS

The foregoing and other advantages and features of the present invention will be better understood from the following description of the preferred embodiment of the invention when taken in conjunction with the following drawings, wherein:

FIG. 1 is a side view of a bottom trawl showing the position of the sorting device formed in accordance with the present invention;

FIG. 2 is a cut-away isometric view of the sorting section of the bottom trawl depicting the sorting device formed in accordance with the present invention;

FIG. 3 is cross-sectional view of the sorting section of FIG. 2 taken along line 3—3;

FIGS. 4A-B are top plan views of the bottom and side panels respectively of the sorting section bottom trawl showing the placement of the sorting device of FIG. 2;

FIGS. 5A-B are top plan views of the top and bottom walls of the sorting device formed in accordance with the present invention; and FIG. 6 is a cross-sectional view of the sorting section of FIG. 2 illustrating the profile of the inflated sorting device and the paths of travel of shellfish and finfish through the sorting section.

FIG. 7 is a cross-sectional view of an alternative embodiment depicting a cod end attached to the outlet of the sorting device formed in accordance with the present invention.

DETAILED DESCRIPTION OF THE PREFERRED EMBODIMENT

Referring first to FIG. 1, a net used for bottom fishing, referred to herein as a bottom trawl 10, is disclosed. The bottom trawl 10 includes a forward body 12, a tapered intermediate section 14, a sorting section 16, a choker intermediate section 18, and a cod end 20. Also shown are bridle lines 22 that are used to attach the bottom trawl 10 to a towing vessel (not shown) in a conventional manner. The bottom trawl 10 and, more particularly, the sorting section 16, is constructed from two opposed side panels 24, a top panel 26, and a bottom panel 28 sewn together along four seams 29. Riblines 31 in the form of heavy rope are laced over the seams 29 to provide longitudinal support to the trawl 10. Preferably the riblines 31 are constructed of one and one-quarter inch Duralon rope manufactured by Samson Ocean Systems, Inc., located in Waltham, Mass.

The forward body 12 defines a mouth 30 that opens to an inside region 32. A plurality of floats 34 are attached to a head rope 36 on the forward body 12 adn also over the cod end 20 to assist in lifting the trawl 10 off the sea floor 37 and in holding the mouth 30 in an open configuration. A plurality of rubber bumpers or bobbins 38 are attached to a foot rope 40 underneath the forward body 12 to assist in supporting and guiding the trawl 10 over obstructions on the sea floor 37.

FIG. 2 depicts the sorting section 16 of the bottom trawl 10. In the preferred embodiment, a sorting device 42 formed in accordance with the present invention is attached to the bottom panel 28. Ideally, the sorting device 42 comprises a top wall 44 and a bottom wall 46 assembled together to form a funnel-shaped body 48 that defines an enlarged opening or inlet 50 which tapers to a small outlet 52. The sorting device 42 is positioned within the sorting section 16 such that the inlet 50 faces toward the mouth 30 of the trawl 10. The outlet 52 is attached to the bottom panel 28.

More particularly, the bottom panel 28 has an opening 54 formed therein that communicates with the outlet 52 of the sorting device 42. Preferably, the sorting device 42 is attached to the bottom panel 28 so that as the bottom trawl 10 is towed through the water, the sorting device 42 assumes a funnel configuration, and the outlet 52 and the interconnected opening 54 are tilted forward to face toward the inlet 50 of the sorting device 42, as is better shown in FIG. 3. With the opening 54 so oriented, objects entering the sorting device 42 pass through the body 48 and out the opening 54 by traveling a substantially straight line and do not have to make a sharp turn downward to exit the sorting device 42. This facilitates quick passage of objects through the sorting device 42 and prevents marine life and debris from collecting around and blocking the outlet 52.

As can also be seen in FIGS. 5A-B, a top cuff 56 and a bottom cuff 58 are sewn along the leading edges of the top wall 44 and the bottom wall 46 respectively. Inserted within the top cuff 56 is a length of stiff tubing 60, preferably formed of one-inch inside diameter hydraulic hose, to assist in holding the inlet 30 in an open configuration. Inserted within the bottom cuff 58 is a length of chain 62, preferably having a five-eighths inch stock diameter, to function as ballast in holding down the bottom of the inlet 30.

Turning now to FIGS. 4A-B, the design and construction of the individual panels for the sorting section 16 will be described. FIG. 4A depicts the bottom panel 28 showing the location of the funnel-shaped sorting device 42 in phantom. FIG. 4B depicts a side panel 24 that is representative of both side panels 24 and the top panel 26. In general, all four panels have a substantially rectangular planform profile and preferably are constructed of four-inch mesh netting formed from 4.0 millimeter polyethylene. The panel dimensions of the preferred embodiment, in terms of mesh size, are approximately 36 meshes wide and 32.5 meshes long.

The bottom panel 28 depicted in FIG. 4A includes a forward edge 64, side edges 66, and a trailing edge 68. Centered on the bottom panel 28 is the opening 54 having a semicircular forward portion 70 and a straight back edge 72. The opening 54 is positioned with the back edge 72 substantially parallel to the forward edge 64 of the panel and is preferably located approximately 90 inches therefrom. In the preferred embodiment, the semicircular portion 70 has a diameter of 25 inches with the straight back edge 72 having a length of 24 inches. The sorting device 42, shown in phantom, is attached to the bottom panel 28 with the inlet 50 positioned approximately 34 inches from the forward edge 64.

FIGS. 5A-B illustrate the top wall 44 and the bottom wall 46, respectively, of the sorting device 42. Preferably, both walls are constructed of heavy, plasticized fabric; however, it is to be understood that the other materials, such as netting or cloth, may be used to partially or wholly construct the sorting device. As shown in FIG. 5A, the top wall 44 has a trapezoidal planform profile. The top wall 44 includes a leading edge 74, angled sides 76, and a trailing edge 78. In the preferred embodiment, the top wall 44 has an overall length $L_1$, of 50 inches, a width $W_1$ at the leading edge 74 of 50 inches, and a width $W_2$ at the trailing edge 78 of 10 inches. The top cuff 56 has a preferred length $L_2$ of 10 inches, and is included in the preferred length $L_1$.

Referring now to FIG. 5B, the bottom wall 46 includes a leading edge 84, curved sides 86, and a trailing edge 88 having a semicircular cutout 90. The bottom cuff 58 is formed at the leading edge 84. The cuff 58 is sewn shut to form tabs 92 on each side, thereby retaining the chain 62 within the cuff 58. To facilitate attachment of the bottom wall 46 to the bottom panel 28, grommets 82 are formed in the tabs 92, along the leading edge 84, and around the semicircular cutout 90.

While the bottom wall 46 has the same overall length and width as the top wall 44, in the preferred embodiment the semicircular cutout 90 has a radius of 12.5 inches as measured from the trailing edge 88 and the curved sides 86 have a radius of 38.25 inches. As such, the curved sides 86 arc out beyond the side 93 of the leading edge 84 but not beyond the tabs 92. Thus, when the top wall 44 and the leading wall 46 are sewn together and the curved sides 86 of the bottom wall 46 are sewn to the angled sides 76 of the top wall 44, the top wall 44 will have a convex curvature both longitudinally and laterally as shown in FIGS. 2 and 3, when the sorting device 42 assumes the funnel configuration. The sewn panels are attached to the bottom panel 28 by means of the grommets 82 along the leading edge 84, trailing edges 88. The grommeted tabs 80, 92 are laced to the rib lines 56. When attached in this manner, the leading edges 74 and 84 extend fully across the bottom panel 28.

The operation of the sorting device 42 will now be described in conjunction with FIG. 6, wherein the sorting device 42 is shown installed in the sorting section 16. As the trawl is towed through the water, the sorting device 42 assumes a funnel-like configuration due to the hydrodynamic action of the water on the body 48. In this configuration, the inlet 32 stretches across the bottom panel 28 of the sorting section 16, and the top wall 44 will have a convex shape both longitudinally and laterally. Consequently, the top wall 44 will pull the bottom panel 28 towards the inlet 32, thus angling the opening 54 to face towards the inlet 32. Because the body 48 tapers downward from the inlet 50 to the outlet 52, water will flow much slower through the body 48 than the surrounding water, forcing the surrounding water to flow moving around and past the sorting device 42. This generates a water disturbance 94 adjacent and ahead of the inlet 50.

Tests have shown that finfish 96 entering the sorting section 16 will tend to swim upward to avoid the water disturbance 94 at the sorting device 42. In addition, some finfish 96 have been observed to take advantage of the water disturbance 94 and ride with it, staying ahead of the inlet 50. However, shellfish 98 entering the sorting section 16, such as crabs and other crustaceans, have the inability to swim around the sorting device 42, and, as a result, they enter the inlet 50 and pass through the sorting device 42 to harmlessly exit through the opening 54. It is to be understood that the sorting device may be constructed in a form other than the funnel-shaped configuration illustrated here and as the perferred embodiment. For instance, the funnel-shaped body may be constructed of more walls than the top walls and the bottom wall described above. In this regard, the invention may be practiced with any turbulence generating barrior or device that utilizes the different behavioral responses of different marine speices to this turbulence to sort them with in a trawl net that is moving through the water.

FIG. 7 illustrates an alternative embodiment wherein the sorting device 42 is used to capture shellfish and avoid capturing finfish. In this embodiment, the sorting section 42 has the outlet 52 communicating with a cod end 100 while the sorting section 16 terminates in an opening 102. In this configuration shellfish 104 entering the sorting device 42 will pass through the outlet 52 and be captured within the cod end 100. Finfish 106 will pass through the sorting section 16 and harmlessly exit through the opening 102.

While a preferred embodiment of the invention has been illustrated and described, it will be appreciated that various changes can be made therein without departing from the spirit and scope of the invention. For instance, the sorting device may be installed within the straight intermediate section of the bottom trawl instead of in the sorting section. In addition, the funnel may be replaced with any structure that creates a water disturbance ahead of a dividing wall to hydrodynamically sort preselected species of marine life into two or more cod ends attached to the trawl. In this manner the sorting device may be used with a net trawling at any level or with a plurality of cod ends. These and other variations are contemplated to fall within the scope of the claims that follow.

The embodiments of the invention in which an exclusive property or privilege is claimed are defined as follows:

1. A sorting device for hydrodynamically sorting marine life in a trawl net, the net having a mouth opening to an inside region and at least one cod end attached thereto, the sorting device comprising:
turbulence means for creating a water disturbance in the inside region of the net that causes preselected marine life to move in one direction in the inside region and nonselected marine life to move in a different direction in the inside region of the net.

2. The sorting device of claim 1, further including a dividing means for dividing the net into at least two sections, such that the preselected marine life are directed by said turbulence means to move into at least one of the sections and nonselected marine life are directed to move into the other of the sections.

3. The sorting device of claim 1, further including an exit means for permitting non-selected marine life passing through said inside region to exit to the outside of the net.

4. In a trawl net having a mouth opening to an inside region formed by a bottom panel, a top panel, side panels, and an enclosed cod end for capturing marine life, a sorting device comprising:
exit means for permitting marine life passing through said inside region to exit to the outside of the net; and
wall means positioned in the inside region of the net for creating a water disturbance upstream of said exit means, the wall means defining an inlet that communicates with said exit means, whereby preselected marine life are directed toward the cod end and nonselected marine life are directed through said inlet to said exit means to thereby exit the trawl net.

5. The apparatus of claim 4, wherein said exit means comprises an opening in the bottom panel of said net.

6. The apparatus of claim 4, wherein said wall means is shaped to have a large opening and a small opening, wherein said large opening comprises said inlet and said small opening comprises an outlet attached to with said exit means.

7. The apparatus of claim 6, wherein said wall means assumes a funnel configuration as the trawl net is towed through the water.

8. A sorting device for hydrodynamically sorting marine life in a trawl net, the net having a mouth opening to an inside region formed by a top panel, a bottom panel, side panels and a cod end for capturing marine life, the apparatus comprising:
an opening in the bottom panel of the net;
an inflatable funnel having an inlet at one end and an outlet at the other end, said funnel being oriented in the inside region of the net to have said inlet facing toward the mouth of the net, said funnel being positioned on the bottom panel of the net so that said outlet of said funnel communicates with the opening in the bottom panel of the net, whereby when the net is pulled through the water, the funnel creates a water disturbance adjacent said inlet that causes preselected marine life to avoid entering said funnel and permits nonselected marine life to enter the funnel and pass through the opening in the bottom panel to the outside of the net.

9. The apparatus of claim 8, wherein said funnel is attached to the bottom panel of the net so that the opening in the bottom panel of the net is tilted upward to face toward the inlet of the funnel as said trawl net is towed through the water.

10. The apparatus of claim 9, wherein said inlet extends across the entire width of the bottom panel.

* * * * *

UNITED STATES PATENT AND TRADEMARK OFFICE
CERTIFICATE OF CORRECTION

PATENT NO. : 4,805,335
DATED : February 21, 1989
INVENTOR(S) : West et al.

It is certified that error appears in the above-identified patent and that said Letters Patent is hereby corrected as shown below:

Column 1, line 2, following the title, insert
--This invention was made with Government support under Cooperative Agreement No. NA-86-ABH-00042, awarded by the National Oceanic and Atmospheric Administration. The Government has certain rights in this invention.--

Column 3, line 26, "adn" should be --and--

Column 5, line 32, "perferred" should be --preferred--

Column 5, line 38, "speices" should be --species--

Signed and Sealed this

Twenty-eighth Day of November 1989

Attest:

JEFFREY M. SAMUELS

*Attesting Officer*     *Acting Commissioner of Patents and Trademarks*